United States Patent [19]
Schluckebier et al.

[11] 3,810,399
[45] May 14, 1974

[54] STEERING GEAR ASSEMBLY

[75] Inventors: Floyd A. Schluckebier, Frankenmuth; Ronald L. Harkrader, Saginaw, both of Mich.

[73] Assignee: General Motors Corporation, Detroit, Mich.

[22] Filed: Feb. 22, 1973

[21] Appl. No.: 334,586

[52] U.S. Cl. ............... 74/409, 74/388 PS, 74/422, 74/499, 92/130, 92/136
[51] Int. Cl. ...... F16h 55/18, F16h 1/12, B62d 1/20
[58] Field of Search ........ 74/409, 422, 499, 388 PS; 92/130, 136; 91/380

[56] References Cited
UNITED STATES PATENTS

| | | | |
|---|---|---|---|
| 2,984,121 | 5/1961 | Folkerts | 74/388 PS X |
| 3,022,772 | 2/1962 | Zeigler et al. | 91/380 X |
| 3,209,610 | 10/1965 | Van Wicklin, Jr. | 74/388 PS X |
| 3,479,897 | 11/1969 | Holthofer | 74/409 X |

*Primary Examiner*—Allan D. Herrmann
*Attorney, Agent, or Firm*—Saul Schwartz

[57] ABSTRACT

A steering gear assembly of the type adapted for automobile application and including a housing, a worm shaft rotatably supported on the housing, a rack nut disposed in the worm shaft for bodily shiftable movement in response to rotation of the worm shaft, a plurality of straight rack teeth on the rack nut, a pitman shaft rotatably supported on the housing and having a sector portion with a plurality of straight gear teeth, the roots of which are parallel to the longitudinal axis of the pitman shaft, and a torsion spring disposed between the rack nut and the housing, the torsion spring functioning to bias the rack nut toward a no-lash position wherein the rack teeth are disposed at an angle relative to the gear teeth so that the former wedgingly engage the latter to eliminate lash therebetween. The gear teeth generate a reaction force on the rack teeth during periods of force transfer therebetween which reaction force rotates the rack nut against the spring bias until the area of contact between the teeth is maximized.

3 Claims, 3 Drawing Figures

STEERING GEAR ASSEMBLY

This invention relates generally to an automotive steering gear assembly and more particularly to the elimination of lash between meshingly engaged gear teeth within the assembly.

The primary feature of this invention is that it provides an improved automotive steering gear assembly of the type including a housing, a worm shaft rotatably disposed on the housing, a rack nut member disposed on the worm shaft, and a sector gear pivotally supported on the housing and including a plurality of gear teeth meshingly engaged with a plurality of rack teeth on the rack nut member. Another feature of this invention is that it provides an improved steering assembly of the type described wherein lash between the gear teeth and the rack teeth is eliminated and wear between the teeth automatically compensated for. Still another feature of this invention is that it provides an improved steering gear assembly of the type described wherein both the rack teeth and the gear teeth are machined straight and wherein the rack teeth are spring biased toward a position angularly displaced with respect to the gear teeth, the angular displacement causing the rack teeth to wedgingly engage the gear teeth so that lash is eliminated therebetween. A further feature of this invention resides in the provision in the improved steering gear assembly of a coil torsion spring disposed between the housing and the rack nut member and adapted to urge the latter and the rack teeth thereon to an angularly displaced or no-lash position relative to the sector gear teeth, the gear teeth being operative to displace the rack teeth and the rack nut member from the no-lash position during periods of force transfer to a position wherein the contact area between the gear teeth and the rack teeth is maximized.

These and other feature of this invention will be readily apparent from the following specification and from the drawings wherein.

Figure 1:
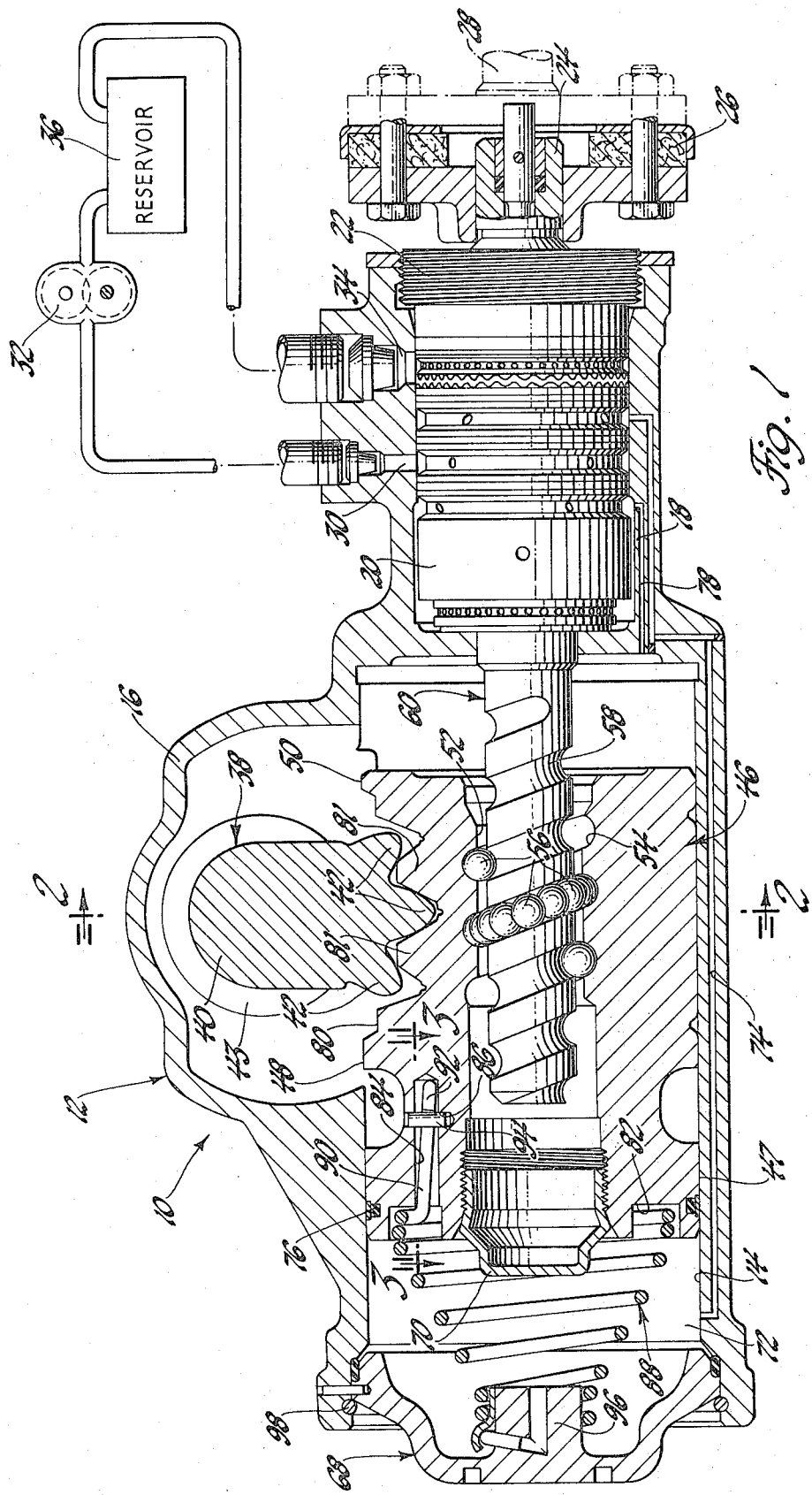
FIG. 1 is a horizontal section view of a steering gear assembly constructed according to this invention.

Referring now to the drawings, FIG. 1 depicts a steering gear assembly particularly adapted for automobile applications and designated generally 10. The steering gear assembly includes a housing 12 defining a cylinder portion 14, a pitman shaft support portion 16, and a valve support portion 18. The valve support portion 18 rotatably houses a fluid directing valve assembly 20, the valve assembly being retained within the valve support portion by a first cap 22 threadedly received on the housing. For a full and complete description of the structure and operation of the valve assembly 20 reference may be made to U.S. Pat. No. 3,022,772, issued in the name of P. B. Ziegler et. al., on Feb. 27, 1962, and assigned to the assignee of this invention.

Generally, the valve assembly rotates within the support portion 18 in response to rotation of a shaft 24 which is connected through a flexible coupling 26 to a steering shaft 28, the steering shaft being rotated by the operator of the vehicle through a conventional steering hand wheel, not shown, disposed on the distal end of the steering shaft. Hydraulic fluid is supplied to the valve assembly 20 through an inlet port 30 from a pump 32 and exhausted through an exhaust port 34 to a reservoir 36 for the pump 32.

Figure 2:
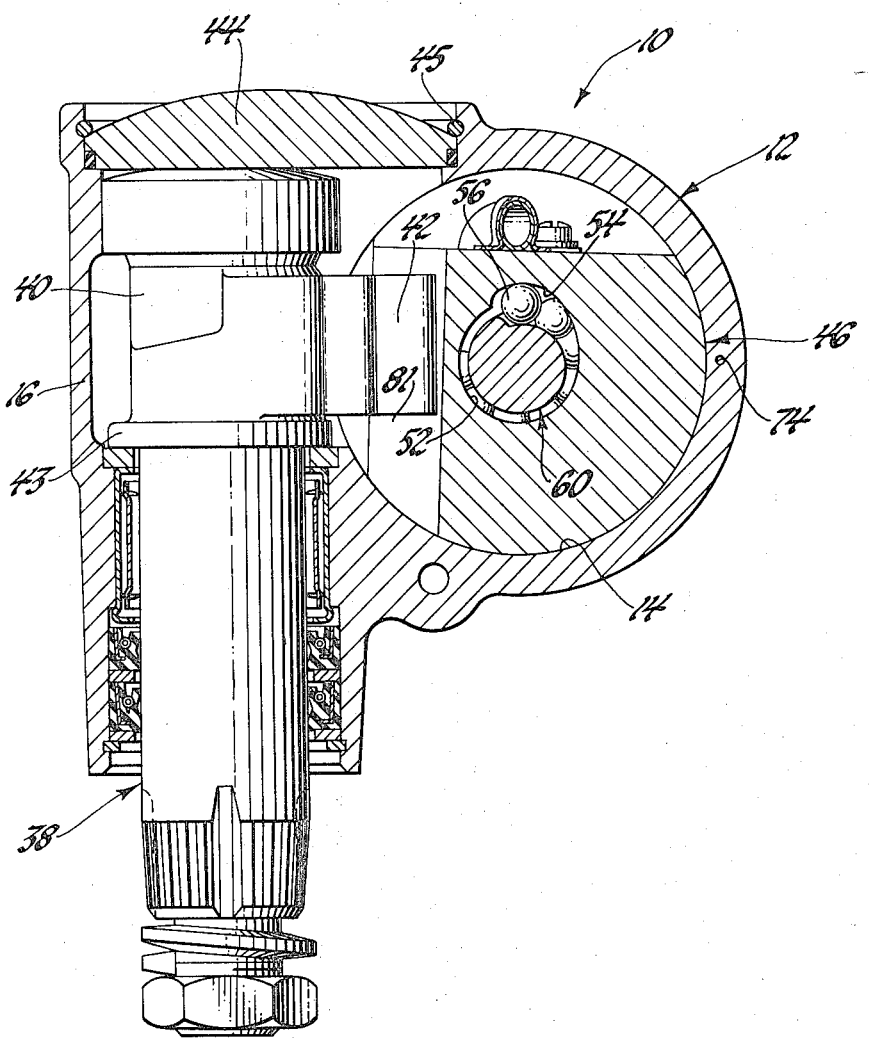
FIG. 2 is a sectional view taken generally along the plane indicated by lines 2—2 in FIG. 1.

As seen best in FIG. 2, the steering gear assembly 10 further includes a pitman shaft 38 rotatably disposed on the support portion 16 of the housing 12. As is conventional, the pitman shaft extends beyond the lower extremity of the support portion 16 and is adapted for connection through conventional linkage, not shown, to the steerable wheels of the vehicle so that rotation of the pitman shaft about its axis effects steering rotation of the wheels.

As seen best in FIGS. 1 and 2, the pitman shaft 38 has integrally formed therewith a sector 40 on which are machined a plurality of straight gear teeth 42. The teeth 42 differ from conventional pitman shaft sector gear teeth, which embody a tapered configuration for permitting lash adjustment through longitudinal movement of the pitman shaft in that the root of each tooth is parallel to the longitudinal axis of the pitman shaft. The pitman shaft 38, while being rotatably supported on the housing 12, is positively restrained against bodily shiftable movement in the direction of its longitudinal axis by a bearing ring 43 and by a second cap 44 disposed in the housing and retained thereon by a conventional retaining ring 45 or the like.

Referring again to FIGS. 1 and 2, a rack nut member in the form of a rack piston 46 is slidably disposed in the cylinder portion 14 of the housing and includes a sealing land 47 and a pair of longitudinally spaced bearing lands 48 and 50. The rack piston 46 further includes a longitudinal bore 52 which has formed on a portion thereof an internal helical thread 54. The thread 54 receives a plurality of anti-friction balls 56, which, in addition to rolling in the thread 54, also roll in an external thread 58 on a worm shaft 60, the worm shaft being journaled on the housing 12 and rotatable by the shaft 24 in response to rotation of the steering shaft 28. Accordingly, as the worm shaft rotates, the rack piston 46 is caused to translate within the cylinder portion 14 of the housing along the longitudinal axis of the worm shaft, the anti-friction balls simultaneously recirculating from one end of the thread 54 to the other through a conventional ball guide on the rack piston.

The cylinder portion 14 is closed and sealed at the leftward end of the housing 12, FIG. 1, by a third cap 68 and the leftward end of the bore 52 in the rack piston is closed by a plug 70 threaded into the open end of the bore, the third cap and the plug cooperating with the housing and the left end face of the rack piston in defining a first pressure chamber 72 connected to the valve assembly 20 through a passage 74 in the housing. A seal 76 on the rack piston separates the first pressure chamber 72 from the remainder of the interior of the housing 12 which remainder defines a second pressure chamber connected to the valve assembly through a passage 78.

As is well known in the art, the pump 32 supplies hydraulic fluid under pressure to the valve assembly 20, which, in turn, directs the pressurized fluid to either of the first and second pressure chambers in response to rotation of the steering shaft 28. Thus, when the worm shaft is rotated by the steering shaft 28 in a direction corresponding to rightward movement of the rack piston 46, FIG. 1, fluid is supplied under pressure through the passage 74 to the first pressure chamber 72 wherein it reacts against the left end face of the rack piston thereby to assist rightward movement of the latter, the second chamber being vented to the reservoir 36 through exhaust port 34. Conversely, when the worm shaft is rotated in the opposite direction, the second pressure chamber is pressurized by the valve assembly through the passage 78 thereby to aid leftward movement of the rack piston, the first pressure chamber being vented to the reservoir through the exhaust port 34.

Referring again to FIGS. 1 and 2, the section of the rack piston 46 between the lands 48 and 50 includes a vertical wall portion 80 in which are machined a plurality of straight rack teeth 81 adapted for meshing engagement with the straight gear teeth 42 on the sector 40. Accordingly, as the rack piston 46 translates within the cylinder portion 14 under the influence of both the pressurized hydraulic fluid and the worm shaft 60, the sector gear and the pitman shaft are caused to pivot or rotate about the longitudinal axis of the pitman shaft.

Figure 3:
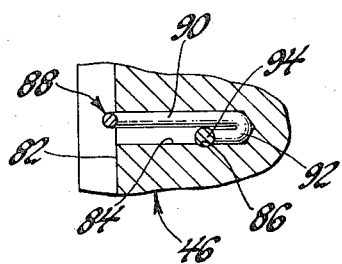
FIG. 3 is a fragmentary sectional view taken generally along the plane indicated by lines 3—3 in FIG. 1.

Referring particularly now to FIG. 1, the left end face of the rack piston 46 includes an annular groove 82 and a blind hole 84 which extends into the rack piston from the base of the groove 82. A cross bore 86 extends into the rack piston between the sealing land 47 and the bearing land 48 and intersects the blind hole 84. A coil torsion spring 88 having a generally conical configuration is seated at one end in the groove 82 and includes a tang 90 terminating in a curled end portion 92. The tang projects into the blind hole 84 and is retained therein by a pin 94 pressed or threaded into the cross bore 86, the pin capturing the curled end portion 92 in the base of the blind hole, FIG. 3. Accordingly, the large diameter end of the spring 88 is rigidly attached to the rack piston 46. The leftward or small diameter end of the spring 88 is coiled about a post 96 integral with the third cap 68, the cap being non-rotatable with respect to the housing 12. The leftward end of the spring is rigidly attached to the post 96 by a conventional means, not shown, and, therefore, is non-rotatable with respect to the housing.

Describing now the operation of the spring 88, the latter is installed on the rack piston subsequent to installation of the rack piston in the cylinder portion 14 but prior to installation of the third cap 68 on the housing 12. The leftward end of the spring 88 is then attached to the post 96 on the third cap and the cap rotated clockwise, FIG. 2, to preload the spring. The preload on the spring, of course, is transferred to the rack piston 46 through the tang 90 so that the rack piston is torsionally preloaded in a clockwise direction, FIG. 2. The rack piston, in addition to being bodily shiftable within the cylinder portion 14, is also adapted for limited rotation about the longitudinal axis about the worm shaft 60, the angular displacement of the piston being limited by wedging engagement between the gear teeth and the rack teeth. Accordingly the rack piston is displaced clockwise by the spring 88 to a no-lash position, FIG. 2, wherein wedging engagement is achieved between the lower reaches of the gear teeth 42 and the corresponding ones of the rack teeth 81. Such wedging engagement effectively eliminates lash between the rack teeth and the gear teeth so that the pitman shaft is virtually instantaneously responsive to bodily shiftable movement of the rack piston. After the spring 88 has been sufficiently preloaded the third cap 68 is rigidly attached to the housing 12, as by a retaining ring 98.

Under no-load conditions, as when zero torque is being applied to the steering shaft, there is no force transfer between the gear teeth 42 and the rack teeth 81 and the rack teeth are disposed at an angle with respect to the gear teeth so that a lash-free condition exists. When torque is applied to the steering shaft and forces are generated between the rack teeth and the gear teeth tending to pivot the pitman shaft about its longitudinal axis, reaction forces are developed on the rack teeth which tend to rotate the rack piston about the longitudinal axis of the worm shaft against the bias of spring 88. Accordingly, the rack piston is angularly displaced against the bias of the spring until the roots of the rack teeth are disposed generally parallel to the roots of the gear teeth in which position full line contact is achieved between the teeth. Under such full line contact conditions, the area of contact between the rack teeth and the gear teeth is maximized so that the force transmission capability of the steering gear assembly is maximized. Of course, when torque input to the steering gear assembly ceases, the rack piston returns to the no-load position relative to the pitman shaft under the influence of spring 88. It is seen, then, that as one or the other of the teeth wear during normal service, such wear is automatically compensated for by the spring 99 which urges the rack teeth into slightly deeper engagement with the gear teeth.

It will be apparent to those skilled in the art that, as the worm shaft is rotated and the rack piston bodily shifted along the longitudinal axis of the worm shaft, the spring 88 is compressed or expanded in accordance with the movement of the rack piston. During such movement, however, the torsional preload is maintained on the rack piston by the spring. It will be further apparent to those skilled in the art that while the steering gear assembly 10 is of the power assist type, the antilash features thereof are equally applicable to manual type steering gear assemblies wherein the rack piston 46 is replaced by a rack nut similar in construction to but lacking the hydraulic reaction surface features of the rack piston 44.

Having thus described the invention, what is claimed is:

1. In a steering gear assembly of the type including a housing, a worm shaft disposed on said housing for rotation about a first axis of the latter, rack nut means disposed on said worm shaft for bodily shiftable movement along said first axis in response to rotation of said worm shaft and defining a plurality of straight rack teeth, and a sector member disposed on said housing for pivotal movement about a second axis of the latter having a plurality of straight gear teeth the roots of which extend parallel to said second axis, said gear teeth being adapted for meshing engagement on said rack teeth so that bodily shiftable movement of said rack nut means effects concurrent pivotal movement of said sector member, the improvement comprising, spring means associated with said rack teeth adapted for biasing said rack teeth toward a no-lash position wherein said rack teeth are angularly displaced relative to said gear teeth so that under conditions of zero force transfer between the former and the latter said rack teeth wedgingly engage said gear teeth thereby to eliminate lash therebetween, said gear teeth effecting angular movement of said rack teeth against the bias of said spring means during periods of force transfer between said rack teeth and said gear teeth to a position maximizing the contact area between the former and the latter.

2. In a steering gear assembly of the type including a housing, a worm shaft disposed on said housing for rotation about a first axis of the latter, rack nut means disposed on said worm shaft for limited angular displacement about said first axis and for bodily shiftable movement along said first axis in response to rotation of said worm shaft, means on said rack nut defining a plurality of straight rack teeth, and a sector member disposed in said housing for pivotal movement about a second axis of the latter having a plurality of straight gear teeth the roots of which extend parallel to said second axis, said gear teeth being adapted for meshing engagement on said rack teeth so that bodily shiftable movement of said rack nut means effects concurrent pivotal movement of said sector member, the improvement comprising, spring means disposed between said rack nut and said housing adapted for biasing said rack nut toward a no-lash position wherein said rack teeth are angularly disposed relative to said gear teeth so that under conditions of zero force transfer between said gear and said rack teeth the latter wedgingly engage the former thereby to eliminate lash therebetween, said gear teeth effecting angular displacement of said rack nut means against the bias of said spring means during periods of force transfer between said rack teeth and said gear teeth to a position maximizing the contact area between the former and the latter.

3. The improvement recited in claim 2 wherein said spring means is a coil torsion spring aligned on said first axis of said housing and anchored at one end on said housing and at the other end on said rack nut means, said coil torsion spring being compressible along said first axis for accommodating bodily shiftable movement of said rack nut means.

* * * * *